Aug. 15, 1939.  G. A. WAHLMARK  2,169,456
FLUID MOTOR OR PUMP
Filed Jan. 25, 1937  3 Sheets-Sheet 1
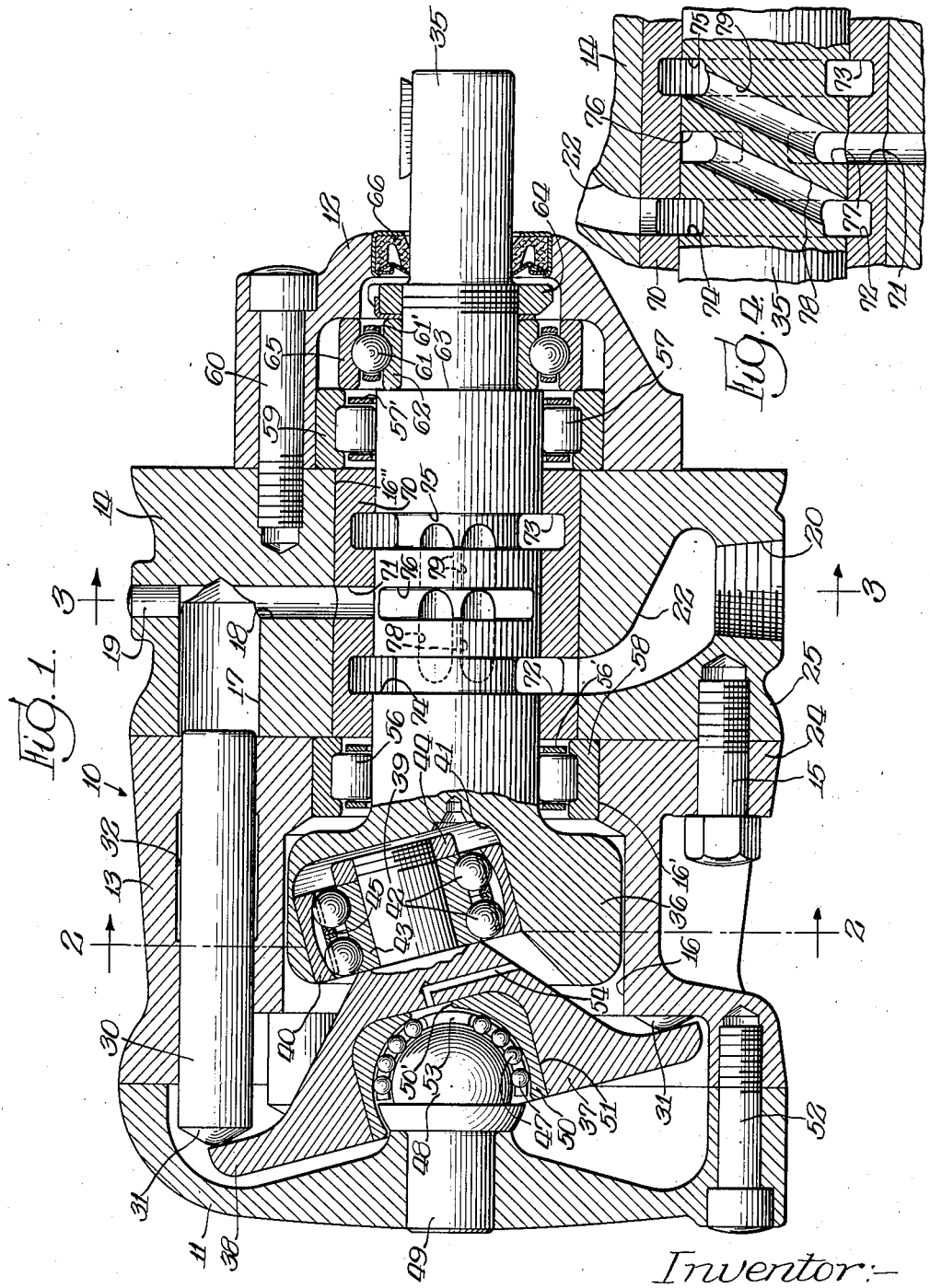
Inventor:—
Gunnar A. Wahlmark,
By ... Atty.

Aug. 15, 1939  G. A. WAHLMARK  2,169,456
FLUID MOTOR OR PUMP
Filed Jan. 25, 1937  3 Sheets-Sheet 2
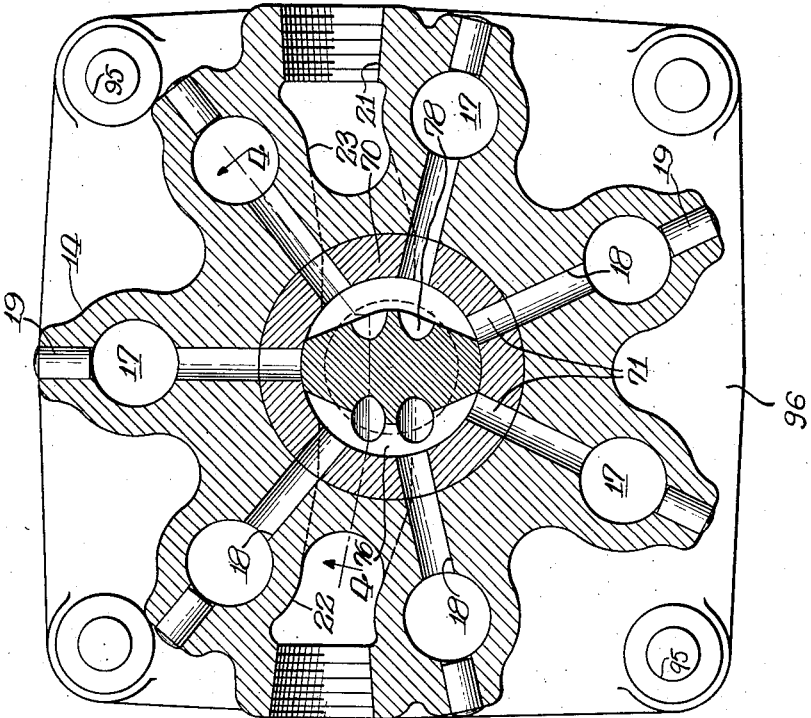
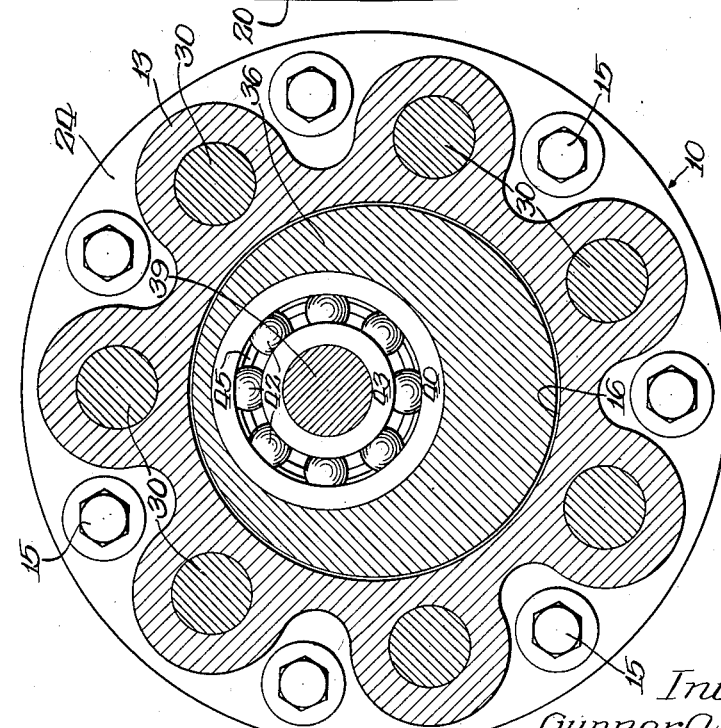
Inventor:-
Gunnar A. Wahlmark,
By
Atty.

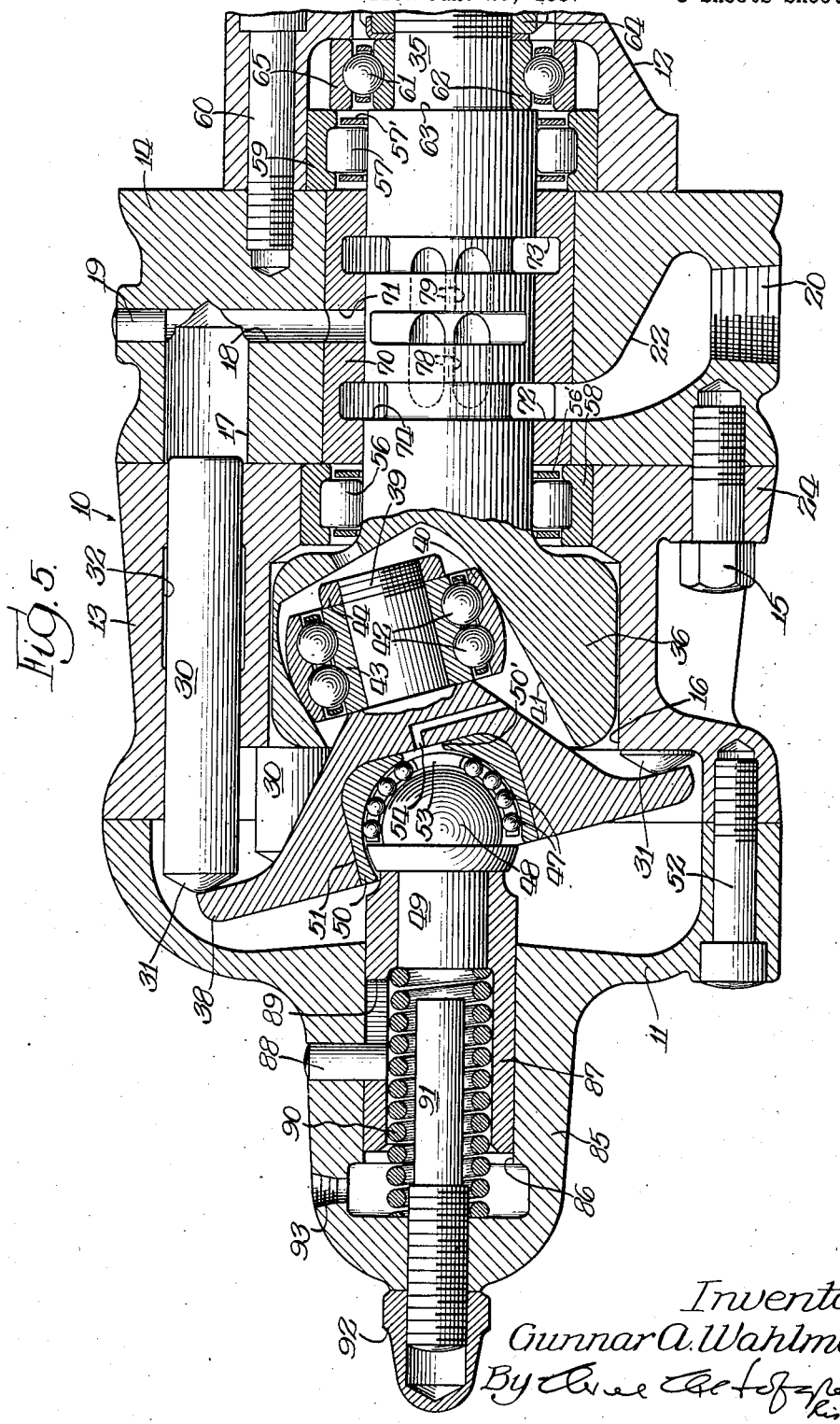

Patented Aug. 15, 1939

2,169,456

UNITED STATES PATENT OFFICE 2,169,456

FLUID MOTOR OR PUMP

Gunnar A. Wahlmark, Rockford, Ill.

Application January 25, 1937, Serial No. 122,141

10 Claims. (Cl. 121—119)

The invention relates to a fluid motor or pump, and particularly to a rotary hydraulic motor of the piston type.

One object of the invention is to provide a hydraulic motor of new and improved design which facilitates starting of the motor and makes possible instantaneous reversal at high speeds.

Another object is to perfect a hydraulic motor having high starting torque and high torque at low speeds.

Yet another object is to perfect a motor or pump having but a single rotating part.

Still another object is to provide a motor or pump of the piston type in which the rotary shaft also constitutes a valve governing the supply and exhaust of fluid to and from the cylinders of the motor or pump.

A further object is to mount the valve portion of the rotary shaft, in a motor or pump having the valve formed as a part of the shaft, in roller bearings having the same diameter as the valve to prevent runout and to facilitate machining of the shaft.

Yet a further object is to provide a motor having a plurality of pistons reciprocated by the application thereto of fluid pressure, a shaft and a wobble plate for converting the reciprocations of the pistons into rotation of the shaft, said plate being mounted on ball bearings and having its arm engaged by the pistons longer than its arm engaging the shaft to produce a motor with high torque at reduced pressure.

Still a further object is to provide a fluid motor having a plurality of pistons, a shaft and a wobble plate, in which the displacement of the motor and the mechanical advantage of the wobble plate are automatically varied to obtain the maximum possible torque at starting of the motor.

Other objects and advantages will become apparent from the following detailed description taken in connection with the accompanying drawings, in which:

Fig. 1 is a diametrical, sectional view of a motor or pump embodying the features of the invention with one of the ports rotated through ninety degrees in order to show in the figure and to render the construction more readily understandable.

Fig. 2 is a transverse sectional view taken approximately along the broken line 2—2 of Fig. 1.

Fig. 3 is a transverse sectional view taken approximately along the line 3—3 of Fig. 1.

Fig. 4 is a fragmentary sectional view taken approximately along the broken line 4—4 of Fig. 3.

Fig. 5 is a diametrical, sectional view similar to Fig. 1 showing a modified form of the invention.

While the invention is susceptible of various modifications and alternative constructions and while certain features of the invention may constitute a part of either a motor or a pump, the invention is herein disclosed in the drawings and will hereinafter be described as embodied in a motor but is not intended that the invention is thereby to be limited, but it is intended to cover all modifications and alternative constructions falling within the spirit and scope of the invention as defined by the appended claims.

As shown in the drawings, such a motor comprises an elongated casing composed of an intermediate main body portion generally designated 10, a cap 11 forming one end of the casing and a housing 12 forming the other end of the casing. The main body portion for convenience in manufacture is herein shown as made up of a section 13 and a section 14 having adjacent ends in abutting relation and secured together by means of bolts 15. Formed centrally of the sections 13 and 14 is a longitudinal stepped bore having portions 16, 16' and 16'' of successively decreasing diameter. In the main body portion are a plurality of longitudinally disposed and annularly arranged cylinders 17 formed in part in the section 13 and in part in the section 14 with the portion of the cylinder in the section 14 slightly larger in diameter than the portion of the cylinder in section 13. Herein the motor is shown as having seven cylinders, each communicating at the end formed in the section 14 with a radial duct 18 communicating with the bore 16''. These ducts may be formed by drilling with the outer end of the duct subsequently closed by means of a plug 19. Also formed in the section 14 are two ports 20 and 21 (see Fig. 3) threaded for the reception of fluid supply conduits. Each of the ports communicates with the bore 16'' by means of a passage 22 and 23 respectively. In order to reduce the amount of material required for the casing, the sections 13 and 14 conform in their exterior contour to the cylinders 17 except for an annular flange 24 on the section 13 and a similar annular flange 25 on the section 14. The bolts 15 which secure the sections together extend through the flange 24 and are threaded into the flange 25 at the recessions in the contour of the sections.

Reciprocable in each of the cylinders 17 is a piston 30 having a rounded end 31 at all times projecting from the cylinder. These pistons have at all times a full bearing surface in the portions of the cylinders 17 formed in the section 13, and in order to reduce the friction each portion of the cylinder formed in the section 13 has an undercut 32 intermediate its ends. The portion of the cylinder formed in the section 14 being of larger diameter than the portion formed in the section 13 and consequently larger than the piston 30, permits the end of the piston to be entirely surrounded with fluid and thus reduces side thrust on the piston.

Extending longitudinally of the motor is a shaft 35 projecting at one end through the housing 12 and terminating at its other end in an enlarged head 36. To impart rotary motion to the shaft 35, means is provided for transforming the reciprocatory movement of the pistons 30 into rotary movement of the shaft. Herein this means takes the form of a wobble plate 37 having an annular laterally extending flange 38 in engagement with the ends 31 of the pistons 30 and a longitudinally extending arm 39 operatively associated with the shaft 35. Preferably, the arm 39 carries a follower 40 which is received in an oblique and eccentric recess 41 formed in the head 36 of the shaft. The follower 40 is in the nature of an outer race for ball bearings 42, the inner race 43 of which is secured to the arm 39 by means of a nut 44. The ball bearings 42 preferably are maintained in proper spaced relation by means of a retainer 45.

In order that the motor may have a high starting torque as well as a high torque at low speeds, the effective arm of the wobble plate acted upon by the pistons 30 is made longer than the effective arm of the wobble plate acting upon the shaft 35. In addition, the shaft, as well as the wobble plate 37, is mounted to have a minimum of frictional resistance. To that end, the wobble plate is journaled on ball bearings 47 interposed between the spherical end 48 of a stud 49 and a cup-shaped bearing race 50 received in a recess 51 formed in the bottom of the wobble plate. The stud 49 is carried by the cap 11 which is secured to the section 13 by means of bolts 52. Preferably, the ball bearings are retained in spaced relation by means of a retainer 53 and the wobble plate is formed with an oil hole 54, registering with a central aperture 50' in the race 50, through which lubricant for the ball bearings is supplied.

The shaft 35 is mounted in two sets of roller bearings 56 and 57, the bearings 56 having an outer race 58 fitting within the portion 16' of the longitudinal bore, while the bearings 57 have an outer race 59 fitting within the housing 12 which is secured to the section 14 by means of bolts 60. Retainer rings 56' and 57' respectively maintain bearings 56 and 57 in spaced relationship. The end thrust on the shaft 35 is taken up by means of a ball thrust bearing 61 also enclosed in the housing 12. The inner race 62 of the thrust bearing is secured between a shoulder 63 on the shaft and a nut 64 threaded onto the shaft, while the outer race 65 bears against the end of the housing 12. A retainer ring 61' maintains the balls of the bearing properly spaced. Leakage outwardly along the shaft is prevented by means of a rotary seal 66.

To reduce the number of rotary parts to a minimum and thereby facilitate reversal of the motor at high speeds, the shaft 35 also functions as a valve controlling the supply and exhaust of fluid to and from the cylinders of the motor. To that end, the portion of the shaft intermediate the roller bearings 56 and 57 is suitably passaged to constitute a valve and is rotatable within a bushing 70 secured in the portion 16" of the longitudinal bore. This bushing is formed with radial apertures 71 registering with the ducts 18 to complete the same, and is also formed with annular, internal and axially spaced grooves 72 and 73 communicating with the ports 20 and 21 respectively through the passages 22 and 23. The shaft 35, in turn, is formed with annular grooves 74 and 75 respectively complementary to the grooves 72 and 73 in the bushing 70. Intermediate the grooves 74 and 75, the shaft is formed with milled cuts 76 and 77 on diametrically opposite sides of the shaft. The milled cut 76 (see Figs. 1 and 4) communicates with the groove 74 by means of diagonal passages 78, while the cut 77 communicates with the groove 75 by means of diagonal passages 79.

The milled cuts 76 and 77 are disposed in the plane of the ducts 18 and, as best seen in Fig. 3, are each in communication with three of the cylinders. The duct leading to the seventh cylinder is closed by the portion of the shaft intermediate the cuts 76 and 77. The three cylinders communicating with one of the cuts 76 or 77 are receiving fluid while the three cylinders in communication with the remaining cut are discharging fluid. The piston in the seventh cylinder is on dead center and has no movement whatsoever, so that the duct leading therefrom may be closed. The shaft 35 may be made to rotate in either direction depending upon whether operating fluid is supplied to the port 20 or to the port 21.

To minimize wear on the bushing and the portion of the shaft rotating therein, to assure that there will be no runout of the shaft with respect to the bushing and to facilitate machining of the shaft, the portion of the shaft forming the valve and the portion received in the bearings 56 and 57 is made of the same diameter throughout, that is, the internal diameter of the bushing 70 is the same as the internal diameter of the bearings 56 and 57. This enables all of the bearing surfaces of the shaft to be machined at the same time and eliminates the difficulty in machining up against shoulders.

Fig. 5 shows a motor of slightly modified construction for obtaining high starting torque. To that end, the end cap 11 is formed with a tubular extension 85 having a cylinder 86 formed therein. The stud 49 upon which the wobble plate 37 is journaled is secured in a sleeve 87 reciprocable in the cylinder 86 of the extension 85. To permit reciprocation of the sleeve 87 and the consequent longitudinal movement of the wobble plate 37, the head 36 of the shaft 35 is enlarged with the oblique recess 41 correspondingly lengthened. The sleeve 87 is urged outwardly of the cylinder 86, to the extent permitted by a pin 88 projecting through the tubular extension and into an elongated groove 89 formed in the sleeve, by a compression spring 90 at one end abutting the stud 49 and at the other end abutting the end of the tubular extension. It will be apparent that with the sleeve 87 urged outwardly to the full extent permitted by the pin 88, the follower 40 will also be received within the recess 41 to the maximum extent, and as a result the pistons 30 will have a maximum stroke, and the follower 40 has a maximum eccentricity with respect to the shaft 35. Thus the motor will have a maximum torque under those conditions. These conditions exist at starting of the motor and persist for a short time after starting, depending upon the load placed upon the motor. After starting, the reaction of the pistons 30 on the wobble plate 37 forces the sleeve 87 inwardly against the spring 90, a distance permitted by a pin 91 disposed to abut the stud 49 and limit the inward movement thereof. This pin is threaded into the tubular extension 85 so as to be adjustable for the purpose of varying the extent of inward movement of the sleeve 87 and consequently the normal operating position of the wobble plate. The pin 91 is concealed and locked in adjusted position by an acorn nut 92 threaded onto the projecting end thereof. Preferably, the extension 85 has a threaded port 93 for the reception of a fluid supply pipe for hydraulically and positively shifting the stud 49 and sleeve 87 while the motor is in operation.

It will be apparent from the foregoing that I have perfected a motor of the piston type having many novel features greatly improving the operating characteristics of that type of motor. Because of the integral construction of the shaft and valve and because the shaft is the only rotating part, the motor is readily reversed even at high speeds for the shaft is light and with little momentum. The starting torque and the torque at low speeds is unusually high because of the mechanical advantage of the wobble plate and because of the ball and roller bearing mounting of the wobble plate and shaft. This starting torque is further increased by the automatically adjustable mounting of the wobble plate shown in the modified construction. Long life of the bushing 70 is assured by the presence of the bearings 56 and 57 on either side thereof taking the entire weight of the shaft. To assure that there will be no runout of the shaft with respect to the bushing, the bearings 56 and 57 are made of the same internal diameter as is the bushing. This also facilitates machining of the shaft. The motor is conveniently mounted through the medium of bolts passed through holes 95 formed for that purpose in the corners of a rectangular flange 96 on the section 14.

I claim as my invention:

1. A device of the character described comprising a casing, a plurality of cylinders formed in said casing, a piston reciprocable in each of said cylinders, a rotary shaft, means operatively associated with said pistons and said shaft for transforming the movement of the one into the movement of the other, a rotary valve for controlling the supply and exhaust of fluid to and from said cylinders in timed relation with the reciprocation of said pistons, a bushing in which said rotary valve rotates, and a roller bearing at each end of said bushing supporting said valve, said bearings having an internal diameter equal to the internal diameter of said bushing.

2. A device of the character described comprising a casing, a plurality of cylinders formed in said casing, a piston reciprocable in each of said cylinders, a rotary shaft, means operatively associated with said pistons and said shaft for transforming the movement of the one into the movement of the other, passages in said shaft forming of said shaft a rotary valve controlling the supply and exhaust of fluid to and from said cylinders in timed relation with the reciprocation of the pistons, and a roller bearing supporting said shaft on each side of said valve portion, the inner circumference of said roller bearings and the outer circumference of said valve portion being of the same diameter.

3. A device of the character described comprising, in combination, a casing having a central bore therein, a plurality of cylinders formed in said casing, a duct leading from each of the cylinders to the bore, an intake and an exhaust port leading from the exterior of said casing to the bore, a piston reciprocable in each of said cylinders, a shaft rotatably mounted in the bore, means operatively associated with said pistons and said shaft to convert the motion of the one into the motion of the other, passages formed in said shaft disposed to cooperate with said ducts and said intake and exhaust ports to control the supply and exhaust of fluid to and from said cylinders in timed relation with the reciprocation of said pistons, and a roller bearing supporting said shaft on each side of the passaged portion thereof, said shaft from bearing to bearing being of uniform diameter.

4. A device of the character described comprising, in combination, a casing having a central bore therein, a bushing fitting snugly within a portion of the bore, a plurality of cylinders formed in said casing, a duct leading from each of the cylinders to the bore within the bushing, an intake and an exhaust port leading from the exterior of said casing to the bore in said bushing, a piston reciprocable in each of said cylinders, a shaft extending through and rotatably mounted in said bushing, means operatively associated with said pistons and said shaft to convert the motion of the one into the motion of the other, passages in said shaft disposed to cooperate with said ducts and with said intake and exhaust ports to control the supply and exhaust of fluid to and from said cylinders in timed relation with the reciprocation of said pistons, and a roller bearing supporting said shaft on each side of the bushing, said roller bearings and said bushing having the same internal diameter.

5. A hydraulic motor comprising an elongated casing, a plurality of longitudinally disposed and annularly arranged cylinders formed in said casing open at one end, a piston reciprocable in each of said cylinders and projecting at one end through the open end thereof, a drive shaft journaled in said casing projecting at one end from the casing and formed at the other end with an enlarged head, a recess in said head opening through the end of the shaft and extending inwardly obliquely to the axis of the shaft, a wobble plate engaged at its periphery by said pistons and having a longitudinal arm projecting into the recess of said shaft, a yieldable support for said wobble plate normally urging the wobble plate axially toward the shaft, and a valve driven from said shaft controlling the supply and exhaust of operating fluid to said cylinders.

6. A hydraulic motor comprising an elongated casing, a plurality of longitudinally disposed and annularly arranged cylinders formed in said casing open at one end, a piston reciprocable in each of said cylinders and projecting at one end through the open end thereof, a drive shaft journaled in said casing projecting at one end from the casing and formed at the other end with an enlarged head, a recess in said head opening through the end of the shaft and extending inwardly obliquely to the axis of the shaft, a wobble plate engaged at its periphery by said pistons and having a longitudinal arm projecting into the recess of said shaft, a stud upon which said wobble plate is journaled slidably mounted in said casing, a compression spring interposed between said stud and said casing urging the stud outwardly to shift the wobble plate toward the shaft, said spring being overcome and said stud shifted inwardly under the reaction of said pistons on the wobble plate after the motor has started, and a pin limiting the outward movement of the stud adjustable to vary the extent of outward movement of the stud.

7. A hydraulic motor comprising a casing, a plurality of cylinders formed in said casing, a piston reciprocable in each of said cylinders, a drive shaft rotatably mounted in said casing and projecting at one end therefrom, a valve controlling the supply and exhaust of operating fluid to the cylinders, a wobble plate operatively interposed between said pistons and said shaft for converting the reciprocatory motion of the one into rotary motion of the other, said wobble plate having a variable engagement with said shaft and mounted for movement bodily relative to said shaft and as an incident to such movement changing the torque of the motor, and yieldable means urging said wobble plate in a direction to result in maximum torque of the motor at starting, said yieldable means being overcome by the reaction of the pistons on said wobble plate after the motor has started, whereby said wobble plate is urged in the opposite direction.

8. A hydraulic motor comprising a casing, a plurality of cylinders formed in said casing, a piston reciprocable in each of said cylinders, a drive shaft rotatably mounted in said casing and projecting at one end therefrom, a valve controlling the supply and exhaust of operating fluid to the cylinders, means operatively interposed between said pistons and said shaft for converting the reciprocatory motion of said pistons into rotary motion of said shaft, said means being variable both to change the displacement of said motor and the mechanical advantage of said converting means, and yieldable means urging said converting means to a position providing maximum torque of the motor during starting and being overcome under the reaction of said pistons after the motor has started to reduce the torque and increase the speed of the motor.

9. A hydraulic motor comprising a casing, a plurality of cylinders formed in said casing, a piston reciprocable in each of said cylinders, a drive shaft rotatably mounted in said casing and projecting at one end therefrom, a valve driven from said shaft controlling the supply and exhaust of operating fluid to the cylinders, means operatively interposed between said pistons and said shaft for converting the reciprocatory motion of said pistons into rotary motion of said shaft, and means for automatically varying the engagement of said converting means with said shaft to vary the mechanical advantage of said motion converting means.

10. A hydraulic motor comprising a casing, a plurality of cylinders formed in said casing, a piston reciprocable in each of said cylinders, a drive shaft rotatably mounted in said casing and projecting at one end therefrom, a valve driven from said shaft controlling the supply and exhaust of operating fluid to the cylinders, a wobble plate having an operative connection with said pistons and a variable operative engagement with said shaft, and means for automatically varying the tilt of said wobble plate and also the engagement thereof with said shaft to vary the torque of the motor by varying the displacement thereof and the mechanical advantage of said wobble plate on said shaft.

GUNNAR A. WAHLMARK.